United States Patent [19]

Barrett

[11] 4,008,799
[45] Feb. 22, 1977

[54] CONVEYOR BELT WEAR PROTECTION
[75] Inventor: William T. Barrett, Waukesha, Wis.
[73] Assignee: Wehr Corporation, Milwaukee, Wis.
[22] Filed: Sept. 8, 1975
[21] Appl. No.: 611,495
[52] U.S. Cl. .................................. 198/698; 198/844
[51] Int. Cl.² ......................................... B65G 15/42
[58] Field of Search ........................... 198/193–195, 198/197–199

[56] References Cited
UNITED STATES PATENTS

| 933,365 | 9/1907 | Cory et al. ................... 198/193 |
| 3,288,273 | 11/1966 | Michaelson et al. .......... 198/195 |
| 3,895,982 | 7/1975 | Persson ....................... 198/198 |
| 3,935,947 | 2/1976 | Barrett ........................ 198/198 |

FOREIGN PATENTS OR APPLICATIONS

| 227,982 | 12/1909 | Germany ..................... 198/193 |
| 108,936 | 8/1917 | United Kingdom ........... 198/193 |

Primary Examiner—Evon C. Blunk
Assistant Examiner—Joseph E. Valenza

[57] ABSTRACT

Wear protection for a conveyor belt is provided by metal plates detachably connected to the belt along its length and located in the central area of the belt. The plates are constructed and arranged relative to each other to prevent foreign matter from becoming lodged between the plates and the belt surface. Cleats are provided on the plates.

2 Claims, 4 Drawing Figures

CONVEYOR BELT WEAR PROTECTION

BACKGROUND OF THE INVENTION

This invention relates to conveyors and conveyor belts and, more particularly, to the prevention of wear in such belts.

U.S. Pat. Nos. 3,809,239 and 3,935,947, both assigned to the assignee of this application, relate to magnetic separators for processing solid waste. The theory of operation of such separators is that the metallic articles in the solid waste are attracted to a moving conveyor belt while the nonmetallic, or other nonmagnetic fractions of the solid waste, fall away from the belt for collection. The magnetic articles are carried by the belt to a collection area separate from the area of collection of the nonmagnetic fraction.

The magnetic fraction consists of cans, nails, and the like. These are attracted to the belt with some force which, together with the nature of the articles themselves, exposes the belt to considerable pounding and abrasion with consequential wear. Conventional belts, even heavy duty belts, wear out rapidly in this type of application and require frequent and costly replacement.

The aforementioned co-pending application was concerned, in one aspect of its disclosure, with the problem of belt wear. This invention is also concerned with the problem of belt wear.

SUMMARY OF THE INVENTION

Among the general objects of this invention is to protect a conveyor belt from excessive wear in an economical and simple to maintain manner; and a more specific object of this invention is to provide such wear protection without major interference with conventional belt operation and with a relatively silent running arrangement.

For the achievement of these and other objects, this invention proposes an arrangement wherein wear resistant plates are detachably connected and cover what would otherwise be the working surface of the conveyor belt. The plates cover an entire longitudinal section of the belt located in the central area of the belt where major belt wear occurs. The belt is left uncovered and exposed between its marginal edges and the edges of the wear plates. The magnetic articles attracted to the belt tend to assume a position in the central area of the belt and relatively little of the magnetic fraction is carried adjacent the marginal edges of the belt. The arrangement of wear plates just described provides for optimum wear protection with a minimum of extra materials.

The plates can be made of any material which exhibits wear resistant characteristics and is not per se magnetic. Conventional nonmagnetic steel can be used for the plates, e.g. stainless steel.

Conveyor belts generally must follow a curvilinear path around pulleys or the like. The plates of this invention are constructed and arranged to accommodate this curvilinear movement. In the preferred embodiment, the plates are bowed in cross section through a plane generally perpendicular to the belt and parallel to belt travel. Also, the plates have a limited length (i.e. in the direction of belt travel) with a number of such plates being located in the area between normally spaced conveyor belt cleats. This configuration allows the plates to pass over the pulleys with minimum relative movement between the plate edges and the belt surface.

Another problem encountered is that particles can become lodged between the belt surface and the plates where they can abrade the belt during operation. In the just described arrangement of bowed plates this problem, preferably, is countered by abutting the adjacent edges of the plates to prevent entry of such particles between the plates and belt. The bowed configuration cooperates in accomplishing this end in that the plates being bowed maintain tight edge contact as the belt and plates proceed along a curvilinear path.

Another way of countering this problem of foreign particles becoming lodged between the plates and belt is to use plates which are straight in cross section but have their adjacent edges overlapping. This is not quite as effective as abutting the edges of the plate and also tends to be noisy, again as compared to the bowed arrangement, but it does provide wear protection.

DESCRIPTION OF THE PREFERRED EMBODIMENT

Figure 1:
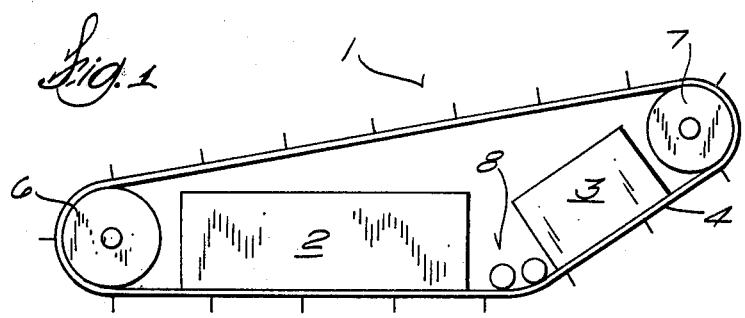
FIG. 1 is an end view of a separator incorporating a belt structure in accordance with this invention.

This invention will be described as embodied in a separator of the type more particularly described in U.S. Pat. No. 3,809,239. Only a general description of the separator structure will be made in this application and should be sufficient to an understanding of this invention, should more details of the structure be necessary, reference should be made to the aforementioned patent.

Separator 1 includes two magnet structures 2 and 3. A continuous belt 4 made of polyurethane or other conventional materials extends around pulleys 6 and 7 and is suitably driven through a closed path by a conventional drive mechanism (not shown). An idler arrangement 8 is located between magnets 2 and 3 and at a curve provided in the path of the separator.

The separator described to this point is generally used with a supply conveyor (not shown) which delivers refuse to an area below magnet 2, the magnetic portion of the refuse is attracted to the belt in the area of magnet 1, carried around the curve past magnet 3 and is dischared into a suitable collection area. The nonmagnetic portion of the refuse falls away from the belt and is collected separately from the magnetics. As is more completely described in the aforementioned patent, the provision of the curve in the belt causes agitation of the refuse shaking loose the nonmagnetic portions, such as paper and the like, which might have been trapped with the materials attracted to the belt.

It has been recognized that in this type of arrangement, the solid waste being collected can include relatively sharp and/or abrasive articles which cause excessive belt wear. To counteract this belt wear, this invention proposes to provide a plurality of plates 9 on the belt, the plates being of relatively high wear resistant characteristics as compared to the material of the belt per se. Plates 9 are arranged along the longitudinal axis of the belt, i.e. along the direction of travel of the belt. The plates cover an entire, uninterrupted longitudinal belt section and are preferably bowed in cross section in a plane generally normal to the belt surface and parallel to the direction of belt travel or its longitudinal axis. The plates prevent direct contact of the solid waste material with the belt surface.

Each plate includes a leading edge 11 and a trailing edge 12, i.e. leading and trailing with respect to the direction of belt travel. Fasteners 13 connect each of the plates to the belt and it will be noted that the belt generally conforms to the bowed configuration of the plates thereby attributing a generally undulating cross section to the belt.

It has been observed further that the major portion of the solid waste tends to accumulate in the central area of the belt. Recognizing that fact, plates 9 are shortened relative to the overall width of the belt so as not to cover the entire width of the belt. The plate ends are spaced inwardly of the longitudinal belt edges leaving exposed areas of the belt between those edges and the marginal edges of the belt. For example, in a conventional belt 60 inches in width, the plates are approximately 24 inches wide and centered on the belt leaving an 18 inch space along either edge of the belt.

This affords optimum belt wear protection with a minimum amount of additional material being added to the basic belt.

Plates 9 can be made of any nonmagnetic material which exhibits increased wear characteristics relative to the material of the belt per se. For example, the belts can be made of stainless steel.

The plates protect the surface of the belt from direct contact with the solid waste but it is also desirable to prevent particles from becoming lodged between the plates and the belt surface. Articles which do become lodged can severely abrade the belt and cause excessive wear. The bowed plate configuration and the belt being attached to those plates and generally conforming to their shape contributes to the prevention of foreign articles becoming so lodged. To further insure against this undesirable situation, the plates are arranged such that the edges of adjacent plates abut. More particularly, the leading edge 11 of one plate tightly abuts the trailing edge 12 of the adjacent or leading plate. This provides a tight joint between the plates and prevents the entry of material.

The plates being bowed permits the plates and the belt to pass over the pulleys and around the curve between the magnets with a minimum of relative displacement as between the belt and the plate. This insures that the tight engagement between the plates and the belt surface is maintained even as the plates proceed with the belt around a curvilinear path. Also, the belt runs very silent without any clatter from engagement as between adjacent protective plates.

It is conventional to provide cleats on the belt surface of a conveyor in a magnetic separator environment to insure that articles attracted to the belt will move with the belt through the magnetic field. Generally these cleats are either molded integrally to or otherwise suitably attached to the belt. In the embodiment of this invention, cleats 17 are provided by L-shaped brackets which are riveted or otherwise suitably connected to the exposed surfaces of selected ones of the plates and extending laterally of the general plane of the belt, specifically normal to the belt surface and to the longitudinal axis of the belt. The cleats are spaced along every five or six plates in the direction of the longitudinal axis of the belt, with a number of plates then covering the belt surface between cleats. Again recognizing the fact that the majority of the attracted waste will be located in the area of the plates, the cleats extend only the width of the plate and not the entire width of the belt.

The cleats are generally made of the same material as the plates so that the cleats too are basically wear resistant.

Figure 4:
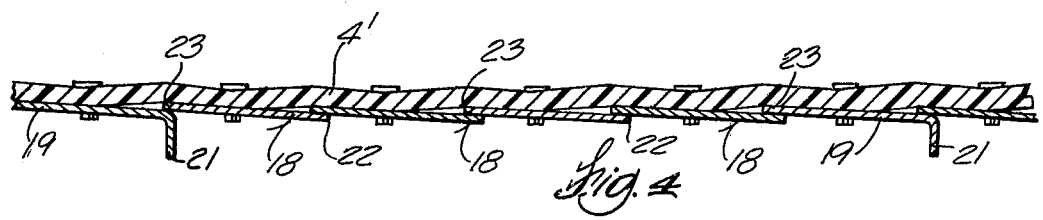
FIG. 4 is a cross section view similar to that of FIG. 2 but illustrating an alternative embodiment.

An alternative protective plate arrangement is illustrated in FIG. 4. With the exception of the acutal construction and arrangement of the plates 18 on the belt 4', the remainder of the separator is identical to that described in connection with FIG. 1 and hence only a portion of the belt and protective arrangement are illustrated in FIG. 4.

Again, plates 18 are made of nonmagnetic, high wear resistant material such as stainless steel. Some of the plates have a general L-shape, consisting of a major generally planar body portion 19 and a cleat portion 21 which extends laterally of the general plane of the belt and, specifically, generally normal to the belt surface and longitudinal axis. As in the embodiment of FIGS. 1–3, each of the plates 18 include a leading edge 22 and trailing edge 23. In this embodiment, the edges rather than abutting each other overlap to prevent the entry of foreign material between the plates and the belt surface.

Figure 2:
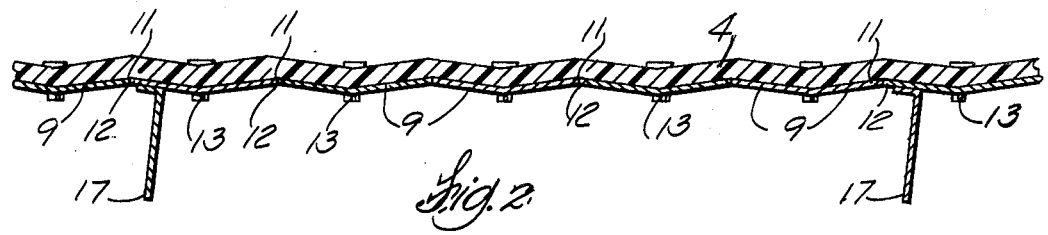
FIG. 2 is a cross section through the belt of FIG. 1 taken generally along line 2—2 of FIG. 3.
Figure 3:
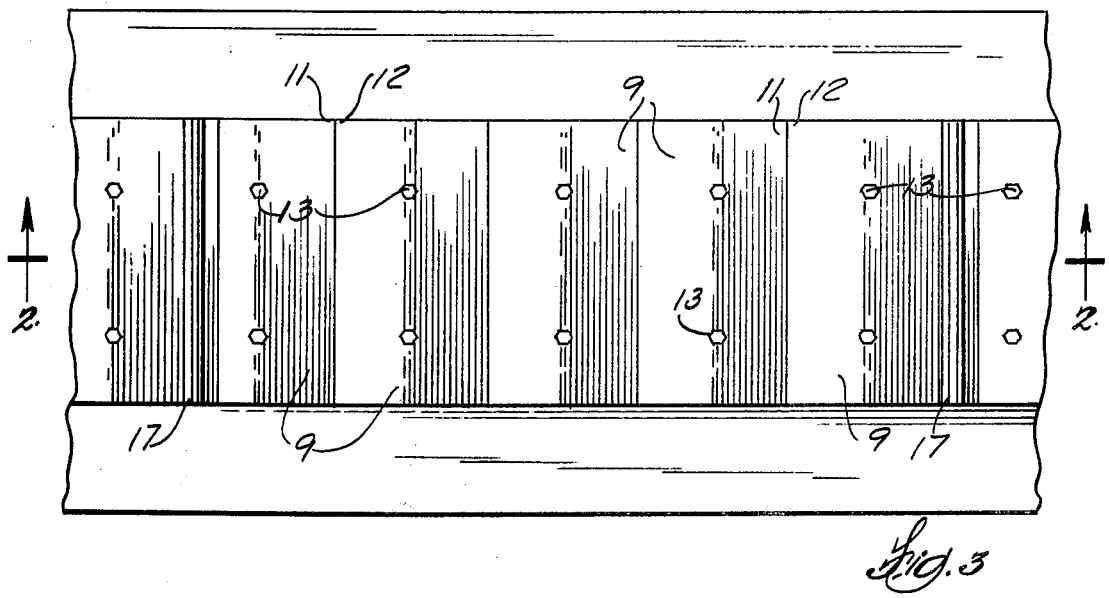
FIG. 3 is a plan view of a portion of the belt illustrated in FIG. 1.

A cleat portion 21 is provided on each fifth or sixth plate, similar to the embodiment of FIGS. 1–3.

The arrangement of FIG. 4 provides wear protection for the belt surface but is not as desirable as that of the previously discussed embodiment. It does not afford as tight an engagement between the plates as that of FIGS. 1–3 to prevent entry of foreign material. As the belt proceeds around a curvilinear path, it will be appreciated that separation will occur between adjacent plates. Secondly, this separation of the plates as it passes around a curvilinear path results in a relatively noisy installation as compared to the embodiment of FIGS. 1–3.

Although this invention has been illustrated and described in connection with particular embodiments thereof, it will be apparent to those skilled in the art that various changes and modifications may be made therein without departing from the spirit of the invention or from the scope of the appended claims.

I claim:

1. A wear protected coveyor belt comprising, in combination, an elongated belt having a longitudinal axis,
a plurality of plates,
means connecting said plates to a surface of said belt with said plates aligned longitudinally on and covering a generally continuous length of said belt,
said plates being spaced inwardly from the longitudinal edges of said belt so that said plates cover the central area of said belt and leave an area of said belt adjacent the longitudinal edges thereof exposed,
said plates also having a bowed configuration in a plane generally normal to said belt surface and parallel to said longitudinal belt axis and said plates having opposite plate edges,
and means defining a cleat attached to a plurality of said plates at points spaced along said longitudinal axis, said cleats projecting laterally from said plates and relative to said belt and also extending generally normal to said longitudinal axis.

2. A wear protected conveyor belt comprising, in combination, an elongated belt having a longitudinal axis, a plurality of plates, means connecting said plates to a surface of said belt with said plates aligned longitudinally on and covering a generally continuous length of said belt, said plates being spaced inwardly from the longitudinal edges of said belt so that said plates cover the central area of said belt and leave an area of said belt adjacent the longitudinal edges thereof exposed, said plates also having a bowed configuration in a plane generally normal to said belt surface and parallel to said longitudinal belt axis and said plates having opposite plate edges with the edges of adjacent ones of said plates abutting, and means defining a cleat attached to a plurality of said plates at points spaced along said longitudinal axis, said cleats projecting laterally from said plates and relative to said belt and extending generally normal to said longitudinal axis.

* * * * *